L. M. Rhodes,

Guano Drill.

No. 113,797. Patented Apr. 18, 1871.

Witnesses:
E. Wolff
L. S. Larabee

Inventor:
L. M. Rhodes
per Munn & Co
Attorneys.

United States Patent Office.

LEONIDAS M. RHODES, OF WARRENTON, GEORGIA.

Letters Patent No. 113,797, dated April 18, 1871.

IMPROVEMENT IN GUANO AND SEED-DRILLS.

The Schedule referred to in these Letters Patent and making part of the same.

*To all whom it may concern:*

Be it known that I, LEONIDAS M. RHODES, of Warrenton, in the county of Warren and State of Georgia, have invented a new and useful Improvement in Guano and Seed-Drill; and I do hereby declare that the following is a full, clear, and exact description thereof, which will enable others skilled in the art to make and use the same, reference being had to the accompanying drawing forming part of this specification.

The object of this invention is to provide a machine for distributing guano or other similar fertilizer, and planting cotton and other seeds either with or without the fertilizer; and It consists in the construction and arrangement of parts as hereinafter more fully described.

In the accompanying drawing—

Similar letters of reference indicate corresponding parts.

Figure 1:
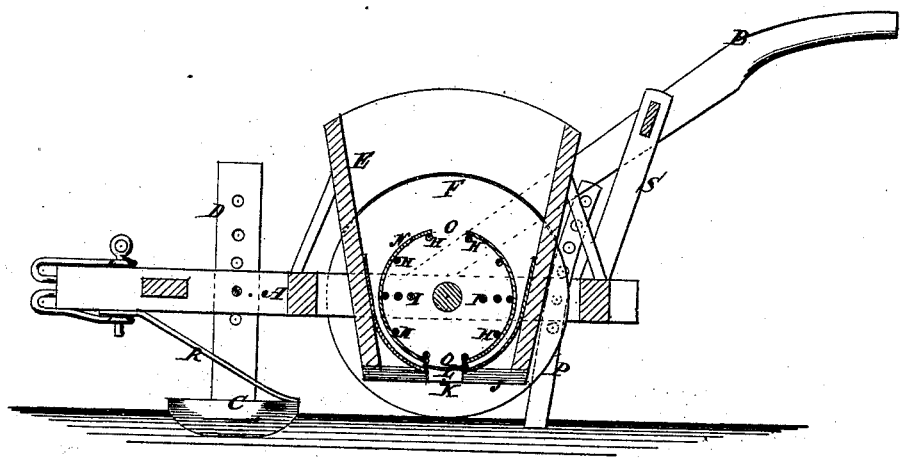
Figure 1 represents a vertical longitudinal section of the drill taken on the line $x\ x$ of fig. 2.
Figure 2:
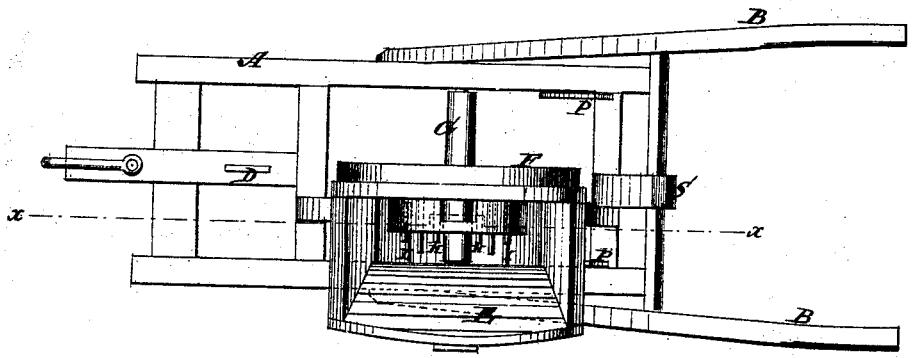
Figure 2 is a top or plane view.

A is a horizontal frame of rectangular form, which incloses the wheel and supports its shaft.

B are the handles attached to the frame.

C is a plow, which is supported by the adjustable standard D in the forward portion of the frame.

This plow forms a furrow or channel as the drill is moved forward, into which the seed and guano are delivered from the hopper.

E is the hopper.

F is a wheel which runs upon the ground.

G is its shaft or axle.

The side of the wheel forms one side of the lower portion of the hopper.

H represents a series of wires placed in a circle in the side of the wheel which projects into the hopper.

I I are wires or rods, which are stationary in the hopper. This arrangement of stationary and revolving wires in the hopper are for the purpose of crushing the lump of guano and keeping it, as well as the seed, from clogging.

J is the bottom plate of the hopper.

K is an orifice therein, through which the guano and seed are delivered.

L is a graduated sliding plate on the bottom J, by means of which the orifice is increased or diminished in size, and by which the quantity of guano dropped is regulated.

N is a removable band, which is placed over the circle of wires H, with slots O O therein. This band is used when seed is to be dropped in hills or at uniform distances apart.

It, of course, revolves with the wheel and wires, and twice in each revolution a slot, Q, will register with the orifice K and seed will drop through.

The distance apart or the spaces between the hills will depend upon the diameter of the wheel F or the number of the slots O.

P P are adjustable bars, to which a transverse piece may be attached for covering the seed. They may also serve as markers for regulating the distance apart of the rows or drills.

R is a spring brace, by which the plow C is supported.

S is a standard at the rear of the frame for supporting the handles.

By this machine guano or other fertilizer may be distributed together or separately, as well as seeds of various kinds to be dropped at intervals, the drill being so constructed that the band N may be readily placed in position, as seen in the drawing, or removed, according to the work to be performed.

Having thus described my invention,

I claim as new and desire to secure by Letters Patent—

1. The wheel F with the wires H, and the hopper E with the stationary wires I, arranged substantially as and for the purposes described.

2. The removable band N, in combination with the wheel F, substantially as and for the purposes described.

LEONIDAS M. RHODES.

Witnesses:
LEVI FOWLER,
W. H. SMITH,
T. H. GIBSON.